(12) United States Patent
Gao (10) Patent No.: US 8,831,050 B2
(45) Date of Patent: *Sep. 9, 2014

(54) TUNABLE LASER

(71) Applicant: Tianjin GP Photonics. Inc., Tianjin (CN)

(72) Inventor: Peiliang Gao, Tianjin (CN)

(73) Assignee: GP Photonics, Inc., Tianjin (CN)

( * ) Notice: Subject to any disclaimer, the term of this patent is extended or adjusted under 35 U.S.C. 154(b) by 92 days.

This patent is subject to a terminal disclaimer.

(21) Appl. No.: 13/631,846

(22) Filed: Sep. 28, 2012

(65) Prior Publication Data

US 2013/0022062 A1    Jan. 24, 2013

Related U.S. Application Data (63) Continuation-in-part of application No. PCT/CN2010/072608, filed on May 11, 2010.

(30) Foreign Application Priority Data

Apr. 1, 2010   (CN) .......................... 2010 1 0137636

(51) Int. Cl.
| | |
|---|---|
| *H01S 3/10* | (2006.01) |
| *H01S 3/106* | (2006.01) |
| *H01S 3/137* | (2006.01) |
| H01S 3/105 | (2006.01) |
| H01S 3/107 | (2006.01) |
| H01S 3/13 | (2006.01) |
| H01S 3/081 | (2006.01) |

(52) U.S. Cl.
CPC ............... *H01S 3/1068* (2013.01); *H01S 3/105* (2013.01); *H01S 3/107* (2013.01); *H01S 3/137* (2013.01); *H01S 3/1305* (2013.01); *H01S 3/0815* (2013.01)
USPC ........ 372/20; 372/13; 372/9; 372/26; 372/28; 359/285; 359/286; 359/287; 359/305; 359/314

(58) Field of Classification Search
CPC . H01S 3/1068; H01S 3/10053; H01S 5/0687; H01S 3/105; H01S 3/107; H01S 3/137; H01S 5/141; H01S 5/4056; H01S 5/4062; H01S 5/4087; H01S 3/117; H01S 3/101
USPC .............. 372/13, 20, 9, 28, 26; 359/285–287, 359/305–314
See application file for complete search history.

(56) References Cited

U.S. PATENT DOCUMENTS

| | | | |
|---|---|---|---|
| 4,250,466 A * | 2/1981 | Jernigan et al. | 372/26 |
| 7,873,081 B1 * | 1/2011 | Gao | 372/20 |

(Continued)

OTHER PUBLICATIONS

Goa Peiliang, WO2011134177 (English translation) Mar. 11, 2011, pp. 1-8.*

(Continued)

*Primary Examiner* — Colleen A Matthews
*Assistant Examiner* — Delma R Forde
(74) *Attorney, Agent, or Firm* — Matthias Scholl P.C.; Matthias Scholl (57) ABSTRACT

A tunable laser, including: a laser resonant cavity; a laser gain medium; an intra-cavity collimating lens; an acousto-optic tunable filter; a device exciting sound waves in an acousto-optic crystal; a radio frequency signal source providing radio frequency energy for the energy transducer and adjusting the oscillation wavelength of the laser resonant cavity by changing radio signal frequency; an optical phase modulator disposed between the intra-cavity collimating lens and the acousto-optic crystal; an optical etalon disposed between the optical phase modulator and the laser gain medium; a wavelength locker disposed at one of zero-order diffraction optical paths of intra-cavity light; a pigtailed collimator coupling laser output light to an optical fiber; a pumping source exciting the laser gain medium; a phase modulator driver for driving the optical phase modulator; and a signal control processing circuit.

12 Claims, 6 Drawing Sheets

(56) References Cited

U.S. PATENT DOCUMENTS

| | | | |
|---|---|---|---|
| 8,369,367 B1* | 2/2013 | Gao | 372/13 |
| 2005/0270629 A1* | 12/2005 | Johnson | 359/305 |
| 2010/0214648 A1* | 8/2010 | Gao | 359/308 |
| 2013/0039371 A1* | 2/2013 | Gao | 372/20 |

OTHER PUBLICATIONS

Goa Peiliang, Drawing of WO2011134177 (English translation) Mar. 11, 2011, p. 1.*

* cited by examiner

TUNABLE LASER

CROSS-REFERENCE TO RELATED APPLICATIONS

This application is a continuation-in-part of International Patent Application No. PCT/CN2010/072608 with an international filing date of May 11, 2010, designating the United States, now pending, and further claims priority benefits to Chinese Patent Application No. 201010137636.2 filed Apr. 1, 2010. The contents of all the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention belongs to the field of optical fiber communication, and more particularly to a high performance tunable laser with high speed tuning, stable wavelength, and power output.

2. Description of the Related Art

Currently, fiber optical telecommunication is employed in most modern telecommunication systems. Fiber optical network has offered unprecedented large capacity and installation flexibility and is able to support a variety of broadband applications that are under unprecedented development. A broadband tunable laser can help utilize the present fiber optical network resources more efficiently. Data traffic flow can be transferred from a congested channel to an unused channel by means of dynamic provision of a broadband network, thus Internet requirements are met. Tunable laser, which is also an important precondition for implementing a dynamic fiber optical network, is capable of establishing or changing an optical path rapidly. Tunable laser, especially the tunable laser with small size, large tuning range and high power output, has also been widely used in the fields of biology, medical apparatus and fiber sensor network, etc.

In view of these applications, such an ideal tunable laser should include the following characteristics: wide tunable range, i.e. covering waveband C and(or) waveband L (approximately 1530 nanometers to 1610 nanometers); small size; fast channel switching speed (faster than 1 millisecond) between frequency interval grids of any two International Telecommunication Unions (ITU); excellent long-term performance stability (service time over 25 years); high reliability under extreme working conditions; and low power consumption and low cost for volume production.

Conventional tunable lasers falls into three types: (1) systems that use mechanical movable components, e.g. diffraction grating, prism, etalon or MEMS (Micro Electronic Mechanical System), as wavelength adjusting unit; the problem with these technologies are as follows: the technology of adjusting wavelength by mechanically adjusting a grating or prism angle is extraordinarily poor in resistance to mechanical shock and vibration, which can cause unstable short-term and long-term performances, and as a result, the tunable filter with movable components is unsuitable to fiber optical communication; (2) systems for tuning wavelength by temperature adjustment through component heating or cooling; the problem is the low tuning speed due to its inherent characteristics of temperature tuning, so the application of such a laser is limited; (3) systems that use non-moving optical devices in the cavity for wavelength adjustment, including the use of magneto-optic device, acousto-optic device or electro-optic device, or current injection for selecting wavelength. The advantages of using acousto-optic technology include high speed wavelength tuning by means of electric control without moving component, wide tuning range and simple structure, etc., therefore, such a system provides a viable solution for tunable lasers that meets the strict application requirements for fiber optical communication system.

SUMMARY OF THE INVENTION

In view of the above-described problems, it is one objective of the invention to provide a tunable laser with quick wavelength tuning, low intra-cavity loss, and high power output.

To achieve the above objective, in accordance with one embodiment of the invention, there is provided a tunable laser comprising:

a laser resonant cavity comprising first and second total reflection cavity minors within a laser oscillating spectral range;

a laser gain medium disposed in the laser resonant cavity and carrying out laser oscillation in a specified laser wavelength range;

an intra-cavity collimating lens;

an acousto-optic tunable filter disposed in the laser resonant cavity, light beam emitted from the laser gain medium being collimated by the intra-cavity collimating lens and then input into the acousto-optic tunable filter at a Bragg angle;

a device exciting sound waves in an acousto-optic crystal and comprising a sound wave energy transducer bonded on a selected surface of the crystal; the acousto-optic tunable filter, the two reflection minors and the laser gain medium being disposed in such a manner that laser oscillation is formed in the laser resonant cavity only by the first order diffracted beam of the acousto-optic tunable filter;

a radio frequency signal source providing radio frequency energy for the energy transducer and adjusting the oscillation wavelength of the laser resonant cavity by changing radio signal frequency;

an optical phase modulator disposed between the intra-cavity collimating lens and the acousto-optic crystal;

an optical etalon disposed between the optical phase modulator and the laser gain medium;

a wavelength locker disposed at one of zero-order diffraction optical paths of intra-cavity light;

a pigtailed collimator coupling laser output light to an optical fiber;

a pumping source exciting the laser gain medium;

a phase modulator driver for driving the optical phase modulator; and a signal control processing circuit.

In a class of this embodiment, the acousto-optic tunable filter is disposed at a position for forming a Bragg angle with respect to collimated beams emitted from the laser gain medium and maintains laser beams for different wavelengths at the Bragg angle.

In a class of this embodiment, the first and second laser cavity minors are a plane mirror, a convex minor, a concave minor, or a combination thereof.

In a class of this embodiment, the optical etalon has a free spectral range of 25 GHz, 50 GHz, or 100 GHz.

In a class of this embodiment, the optical phase modulator is an electro-optical phase modulator, or a physical optics effect-based optical phase modulator in other forms.

In a class of this embodiment, the wavelength locker comprises a beam splitter disposed in one of the zero-order diffraction optical paths of intra-cavity light and at 45-degree angle therewith; a first photoelectric detector for receiving reflective light from the beam splitter; an optical filter having wavelength-varying transmittance disposed between the beam splitter and a second photoelectric detector; and the second photoelectric detector for receiving an optical signal output from the optical filter having wavelength-varying transmittance.

In a class of this embodiment, the pigtailed collimator comprises a polarization maintaining fiber and a gradient index lens, or a single-mode fiber and a gradient index lens.

In a class of this embodiment, the acousto-optic tunable filter comprises an anisotropic birefringent acousto-optic crystal with optical spectrum characteristics conforming to laser spectral requirements.

In a class of this embodiment, the signal control processing circuit comprises a microprocessor; a first digital-to-analog converter connected to the microprocessor to control the laser pumping source; a second digital-to-analog converter connected to the microprocessor to control the optical phase modulator driver; a third digital-to-analog converter connected to the microprocessor to control a radio frequency source; a first analog-to-digital converter connected to the first photoelectric detector to detect laser power and input a signal to the microprocessor; and a second analog-to-digital converter connected to the second photoelectric detector to detect an optical signal output by the optical filter with variable transmittance, and feed the optical signal back to the microprocessor for laser wavelength control.

In a class of this embodiment, a ratio of reflectivity/transmittance of the beam splitter is 50%.

In a class of this embodiment, the optical filter having wavelength-varying transmittance is a multilayer dielectric thin film filter or an optical etalon.

In a class of this embodiment, the optical characteristics of the first photoelectric detector and the second photoelectric detector are matched with laser output spectrum.

Advantages of the invention are summarized below:
1. The tunable laser comprising a laser gain medium, an acousto-optic tunable filter with a single radio frequency energy transducer, an optical phase modulator, and a signal control processing circuit based on a microprocessor provides the precision and power stability of an output wavelength which is achieved by a wavelength locker and a power monitor and feedback control system; and different laser gain media, sound wave driving frequencies, and acousto-optic crystals can be used to meet the requirements for sub-millisecond level broadband tuning speed, small size, and high reliability.
2. The tunable laser has a simple structure with low cost components and therefore can be mass produced at low cost with easy assembly.
3. The tunable laser is designed to meet the requirements on sub-millisecond level tuning speed, small size and long term reliability in an extreme working environment for fiber optical telecommunication.

DETAILED DESCRIPTION OF THE EMBODIMENTS

For further illustrating the invention, experiments detailing a tunable laser are described below. It should be noted that the following examples are intended to describe and not to limit the invention.

The preferred embodiments of the tunable laser will be described in details below.

Figure 1:
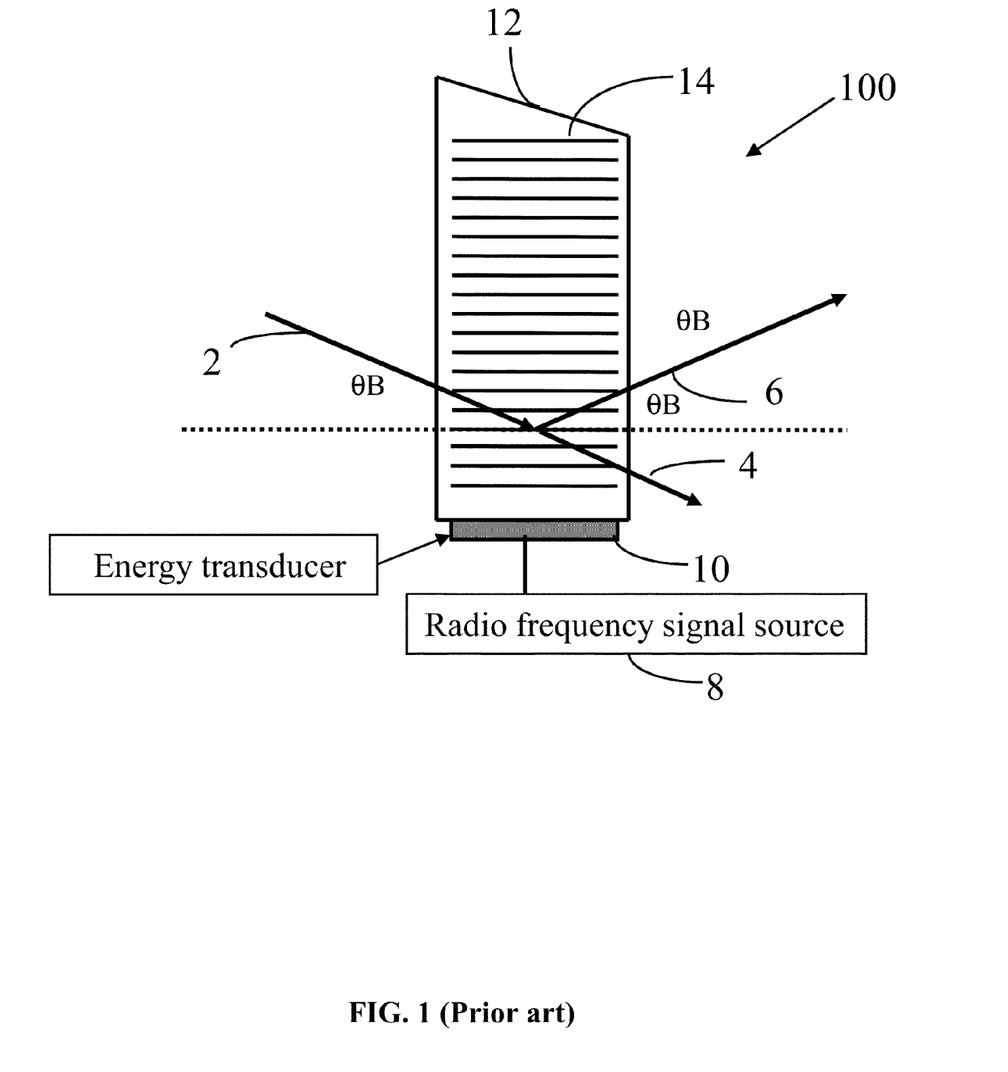
FIG. 1 shows a tunable filter that comprises an acousto-optic crystal with a single energy transducer and a radio frequency power source in accordance with one embodiment of the invention.

An acousto-optic tunable filter is shown as FIG. 1. The acousto-optic tunable filter 100 comprises a radio frequency signal source 8, an acousto-optic energy transducer 10, and an acousto-optic medium 12.

There are two types of acousto-optic tunable filter: collinear and non-collinear. The non-collinear type comprises isotropic Bragg diffraction type and far-off axis anisotropic Bragg diffraction type. Of these, the far-off axis anisotropic Bragg diffraction has more practical application value due to its narrow diffraction bandwidth.

In one embodiment, the acousto-optic medium 12 is an anisotropic birefringent crystal for its narrow diffraction bandwidth. A crystal satisfying these properties is tellurium dioxide ($TeO_2$), which has high optical uniformity and low light absorbency and has high optical power damage threshold when working in a shear mode. Thus, because of these advantages, $TeO_2$ has been widely used in many applications.

Other crystals, e.g. lithium niobate ($LiNbO_3$), calcium molybdate ($CaMoO_4$), or lead molybdenum oxide ($PbMoO_4$), are also often used as the materials for acousto-optic device. There are many factors affecting the selection a particular crystal for certain applications, for example, the type of acousto-optic device, the availability of high-quality crystal, and application conditions and requirement, e.g. diffraction efficiency, power loss, separation angle of incident light and diffracted light, and the size of the device, etc.

For applications in 100 GHz or 50 GHz dense wavelength division multiplexing (DWDM) fiber optical telecommunication (the C and L band wavelength range is approximately from 1530 nanometers to 1610 nanometers), the tunable filter 100 is a non-collinear, fax-off axis Bragg diffraction type working in shear mode. In one embodiment, when far-off axis anisotropic Bragg diffraction exceeds certain frequency, the Bragg angle of an incident angle is suddenly increased and filter bandwidth also becomes narrower, as described in some U.S. patents.

This type of Bragg diffraction is usually used for narrowband filter. The use of tellurium dioxide ($TeO_2$) as crystal material is only based on the following consideration and does not limit the use of other crystals: tellurium dioxide has low sound wave velocity, acoustically anisotropic property and optically birefringent property as has been discussed in some U.S. patents and other published books. The crystals that are usually used for manufacturing acousto-optic tunable filter (AOTF) comprise lithium niobate ($LiNbO_3$), calcium molybdate ($CaMoO_4$) and tellurium dioxide ($TeO_2$). In the case of $TeO_2$, the transmission velocity of sound wave in a nonlinear mode is $0.6*10^5$ cm/sec. In the case of $LiNbO_3$, the transmission velocity of sound wave in a collinear mode is $6.57*10^5$ cm/sec. And in the case of $CaMoO_4$, the transmission velocity of sound wave in a collinear mode is $6.0*10^5$ cm/sec.

The energy transducer 10 is bonded to the acousto-optic crystal. In one embodiment, the energy transducer is bonded to the crystal on a selected surface, and the opposite side to the transducer usually has a slope to avoid the interference of reflected sound wave with the forward traveling sound wave, thereby enhancing performance stability.

The radio frequency signal source 8 transmits a sound wave 14 to the acousto-optic medium 12 through the energy transducer 10. The radio frequency range used in many applications is from a few megahertz to hundreds of megahertz.

Refer to FIG. 1, light 2 enters the acousto-optic medium 12 at a Bragg angle, $\Theta i=\Theta B$, namely, the incident angle is equal to the Bragg angle. The Bragg angle can be computed using the formula below: $\sin\Theta B=\lambda 0/(2n\Lambda)$, wherein $\lambda 0$ is wavelength of the incident light, n represents refractive index of the acousto-optic medium, and $\Lambda$ is wavelength of the sound wave. The sound wave 14 generated by the energy transducer enables the light 2 to be diffracted as a first-order diffraction light 6 with an output angle $\Theta B$, and a zero-order diffraction light 4 traveling in the same direction as the incident light 2. Thus, output wavelength can be selected via the frequency of the power source driving the transducer 10 on the acousto-optic crystal 12.

Figure 2:
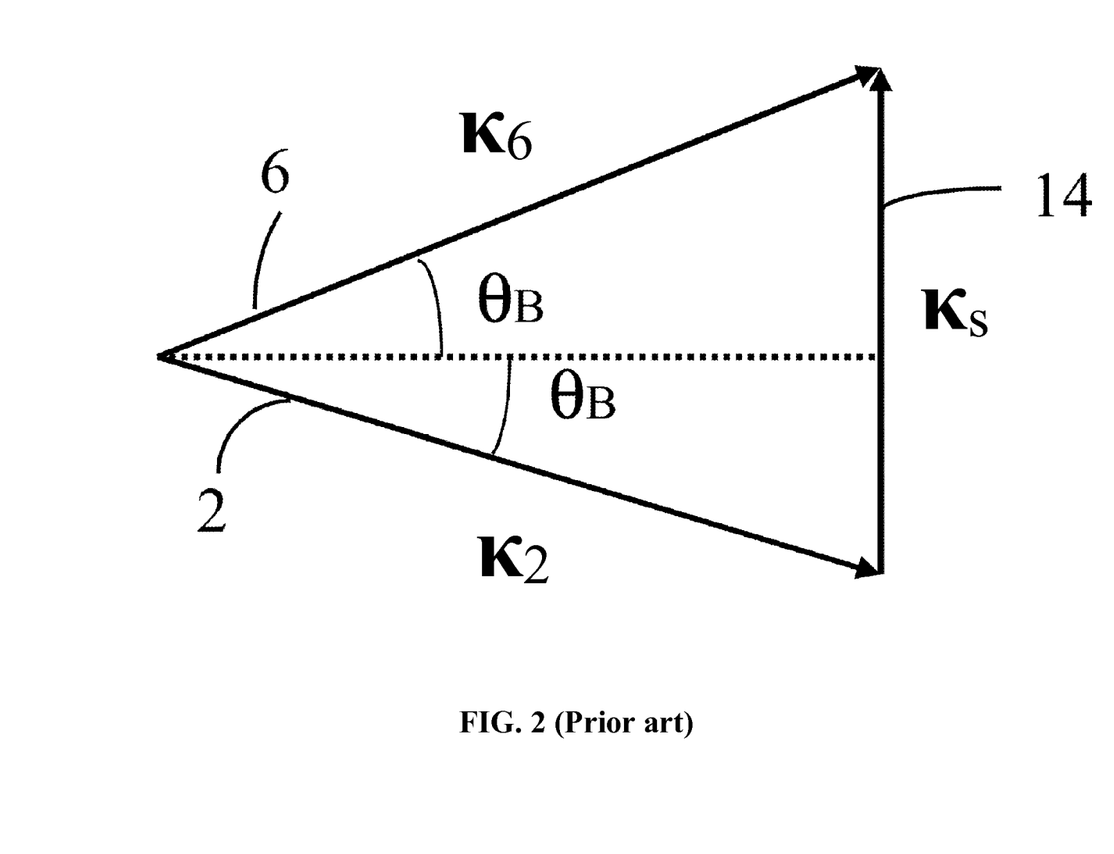
FIG. 2 shows wave vector relations of an incident light entering an acousto-optic filter at Bragg angle, a diffracted light, and a sound wave.

FIG. 2 shows the relations of the wave vectors of an incident light 2 (denoted by vector $\kappa_2$), a diffracted light 6 (denoted by vector $\kappa_6$) and a sound wave (denoted by vector $\kappa_s$), which can be expressed by: $\kappa_2+\kappa_s=\kappa_6$, and the sound wave leads to upward shift of the frequency of the diffracted light.

Figure 3:
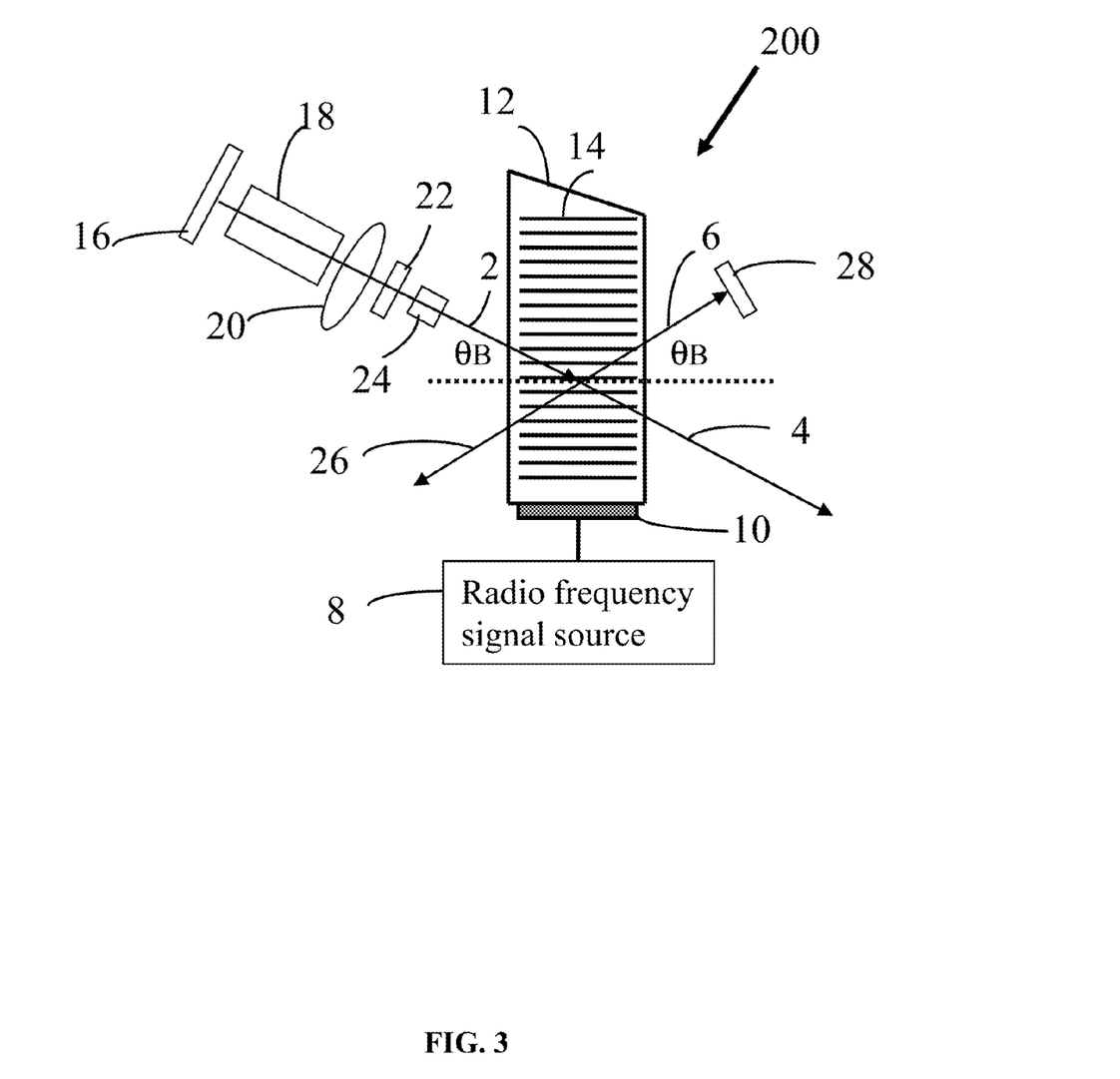
FIG. 3 is a schematic plan view of a tunable laser.

One embodiment of the tunable laser 200 is shown in FIG. 3, which uses an acousto-optic tunable filter (AOTF) 100 as the tunable filter. A laser resonant cavity comprises two reflection cavity mirrors 16 and 28 with total reflection (i.e. 100% reflectivity).

Typically, the reflectivity of laser mirror differs according to different wavelengths and the reflectivity here is corresponding to the wavelength bandwidth of the laser. The purpose of the laser cavity mirrors is to provide so-called 'positive feedback' for the laser resonant cavity.

The reflective multilayer dielectric thin films can be coated on laser gain medium directly, and this is particularly common for semiconductor gain medium. The laser cavity, which is formed by two flat minors, is called Fabry-Perot cavity or plane parallel cavity, also known as 'critical stable laser resonant cavity', generates a zigzag-shaped optical path. This resonant cavity is very sensitive to the interference of mechanical vibration as well as off-axis light.

Two other laser resonant cavities comprise unstable cavity and stable cavity. The unstable laser resonant cavity uses convex mirrors or the combination of convex mirror and plane minor as two cavity minors. The stable laser resonant cavity uses concave mirrors or the combination of concave minor and plane minor as cavity minors. In practical application, the designs and application conditions of different laser resonant cavities could be used to meet different requirements for the laser output power and laser modes.

A laser gain medium 18, shown as FIG. 3, is disposed between two cavity minors 16 and 28 with total reflectivity. Light emitted from the laser gain medium is provided with positive feedback and is further amplified. Any wavelength within the laser medium gain profile can be amplified in the laser resonant cavity.

In the disclosed embodiment for fiber optical telecommunication application, a semiconductor gain chip is used as the laser gain medium and its lasing mechanism is based upon the recombination of light-excited PN junction hole and free electrons. Light emitted from the semiconductor gain medium can be described by limited distribution of photon energy that takes the forbidden bandwidth of the material in active region of semiconductor amplifier.

An intra-cavity collimating lens 20 collimates a divergent light emitted from the laser gain medium into the collimated light 2. It is very important to reduce the divergence of incident light because the divergence of the diffracted light by the acoustic optical filter is directly affected by the divergence of incident light and is crucial to the operating performance of the laser.

An acousto-optic tunable filter 100 is disposed between the intra-cavity collimating lens 20 and the cavity mirror 28. The phase matching of laser mode is realized for different wavelengths by changing the frequency of radio signal (RF) and the optical phase modulator 22. It is noteworthy that, a lead zirconate titanate (PZT) base can also be used for laser cavity phase matching purpose. When driven by an electrical voltage, a PZT base on which a cavity mirror is bonded can move the cavity mirror and change the laser cavity length.

In one embodiment, the optical phase modulator 22 is a photoelectric modulator. Theoretically, the phase modulator 22 can be disposed at any position in the laser resonant cavity. To obtain the best performance, the phase modulator 22 should be disposed at the position in the laser resonant cavity that has minimal cavity beam divergence. In a laser system 200 shown as FIG. 3, the optical phase modulator 22 is disposed between the intra-cavity collimating lens 20 and the acousto-optic crystal 12.

Lights 4 and 26 are zero-order diffraction lights corresponding to the intra-cavity lights 2 and 6 respectively, and 'leaked' from the laser resonant cavity in the process of laser oscillation. These two 'leaked' lights may both be used as laser outputs. In practical application, only one of these two lights is used as laser output, while the other one is generally taken as the loss of the laser resonant cavity, or may be used for laser power monitoring and wavelength locking purposes. The way of using these 'leaked' lights for laser power monitoring and wavelength locking will be described in details hereinafter.

An optical etalon is usually needed to establish optical frequency interval in the application of DWDM optical fiber communication network, the optical frequency interval between two channels in DWDM network is 25 GHz or 50 GHz or 100 GHz. In the embodiment shown in FIG. 3, an optical etalon 24 having a free spectral range of 25 GHz, or 50 GHz or 100 GHz is disposed between the phase modulator 22 and the acousto-optic crystal 12.

Figure 4:
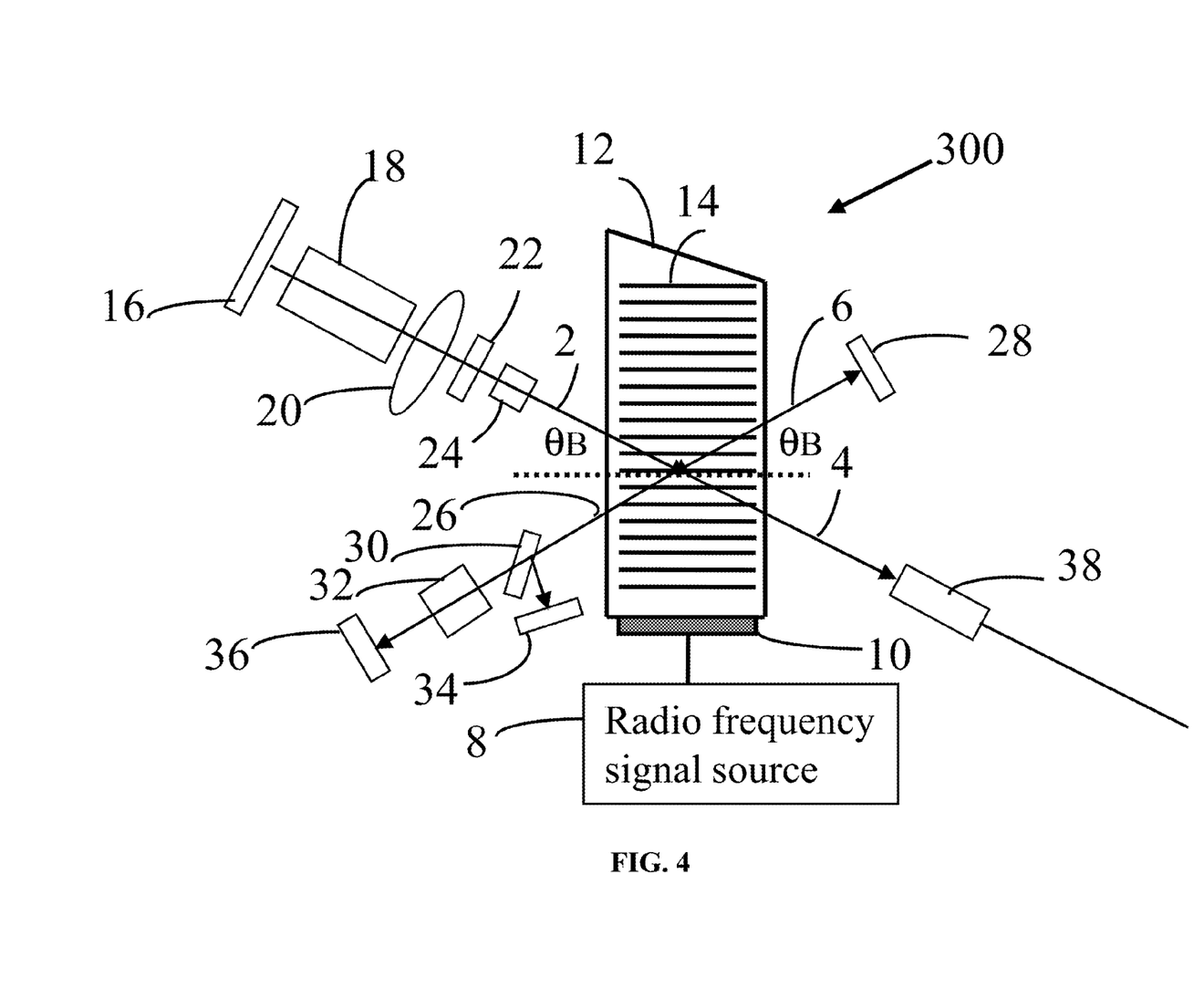
FIG. 4 is a schematic plan view of a tunable laser that comprises a power monitoring and wavelength locking unit.

One embodiment of the tunable laser 300 is shown as FIG. 4. The tunable laser 300 is provided with a wavelength locker and a pigtailed collimator to couple the laser output to an optical fiber. In this application, collimator 38 uses polarization maintaining fiber. If the polarization state of laser output does not need to be maintained, other types of fiber, such as single mode fiber, may be used.

The wavelength locker is disposed along the light 26, which does not introduce optical insertion loss to the laser cavity because it is located outside the laser resonant cavity. The wavelength locker comprises a beam splitter 30, photoelectric detectors 34 and 36 and an optical filter 32 having wavelength-varying transmittance. The beam splitter 30 has approximately 50% ratio of reflectivity/transmittance and is used for reflecting a part of the light 26 to the photoelectric detector 34. The optical filter 32 is disposed between the beam splitter 30 and the photoelectric detector 36. The photoelectric detector 36 is used for monitoring power change that results from the change of laser wavelength.

The laser output light 4 is coupled to an optical fiber by collimator 38. If the polarization state of output laser needs to be maintained, polarization maintaining fiber can be used, otherwise, a single mode fiber can be used.

Multilayer dielectric thin film filter or low fineness etalon is used as optical filter in such applications. In one embodiment, a multilayer dielectric thin film filter is used for optical filter 32. In another embodiment, a low fineness optical etalon is used for optical filter 32. Both the thin film filter and the low fineness etalon with the required relation between transmittance and wavelength can be designed and produced at low cost.

Figure 5:
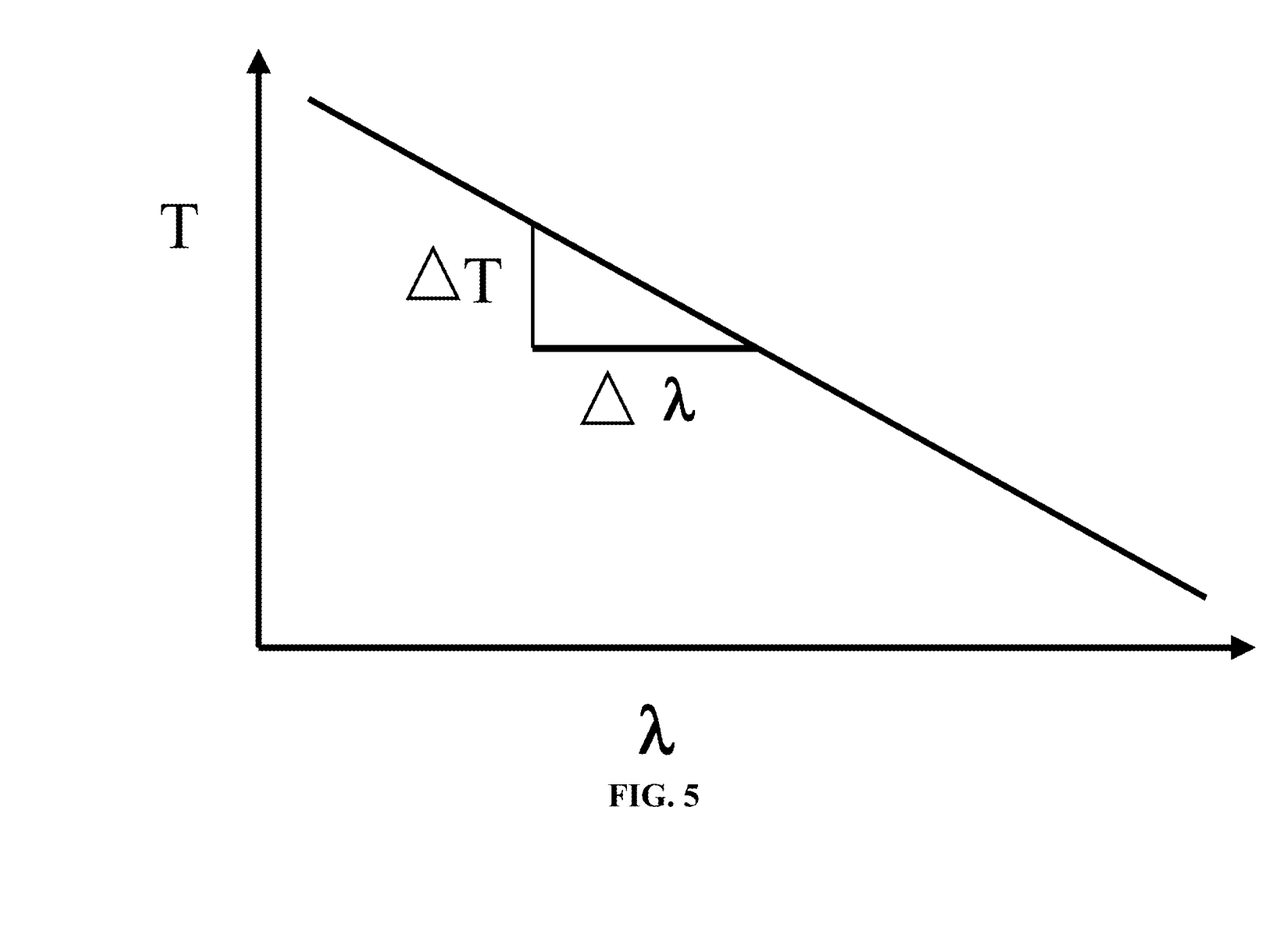
FIG. 5 shows a linear relation or an approximately linear relation between power transmission and wavelength by a low fineness etalon or a multilayer dielectric thin film filter for wavelength locking.

FIG. 5 shows the relation between wavelength and transmittance (T) of optical filter 32. The relation between the wavelength and the transmittance of the optical filter 32 can be expressed by the following formula: $\lambda = \alpha T + \beta$, wherein $\alpha$ and $\beta$ are determined by insertion loss and slope that is generated by linear fitting of wavelength. The numerical value of $\alpha$ may be designed based on different application conditions, wavelength ranges and the required wavelength locking accuracy.

The power received by detector 36 is directly proportional to the transmittance T, so the relation between the wavelength $\lambda$ and the power P received can be expressed as: $\lambda = \alpha P + \beta$, and can be further expressed as: $\Delta\lambda = \alpha \Delta P$. Assume that the laser resonant cavity's power keeps unchanged, power change ($\Delta P$) detected by the photoelectric detector 32 is caused only by wavelength change ($\Delta\lambda$).

When this power change is fed back to closed feedback loop, laser wavelength can be 'pulled back' to a designated wavelength by changing the signal frequency of the radio frequency (RF) signal source 8, and/or changing the phase of the laser resonant cavity by phase modulator 22. During normal operation of the tunable laser 300, the laser power can be monitored accurately by the photoelectric detector 34, and such information can be used in a closed feedback control loop to monitor and maintain stable laser power output.

Figure 6:
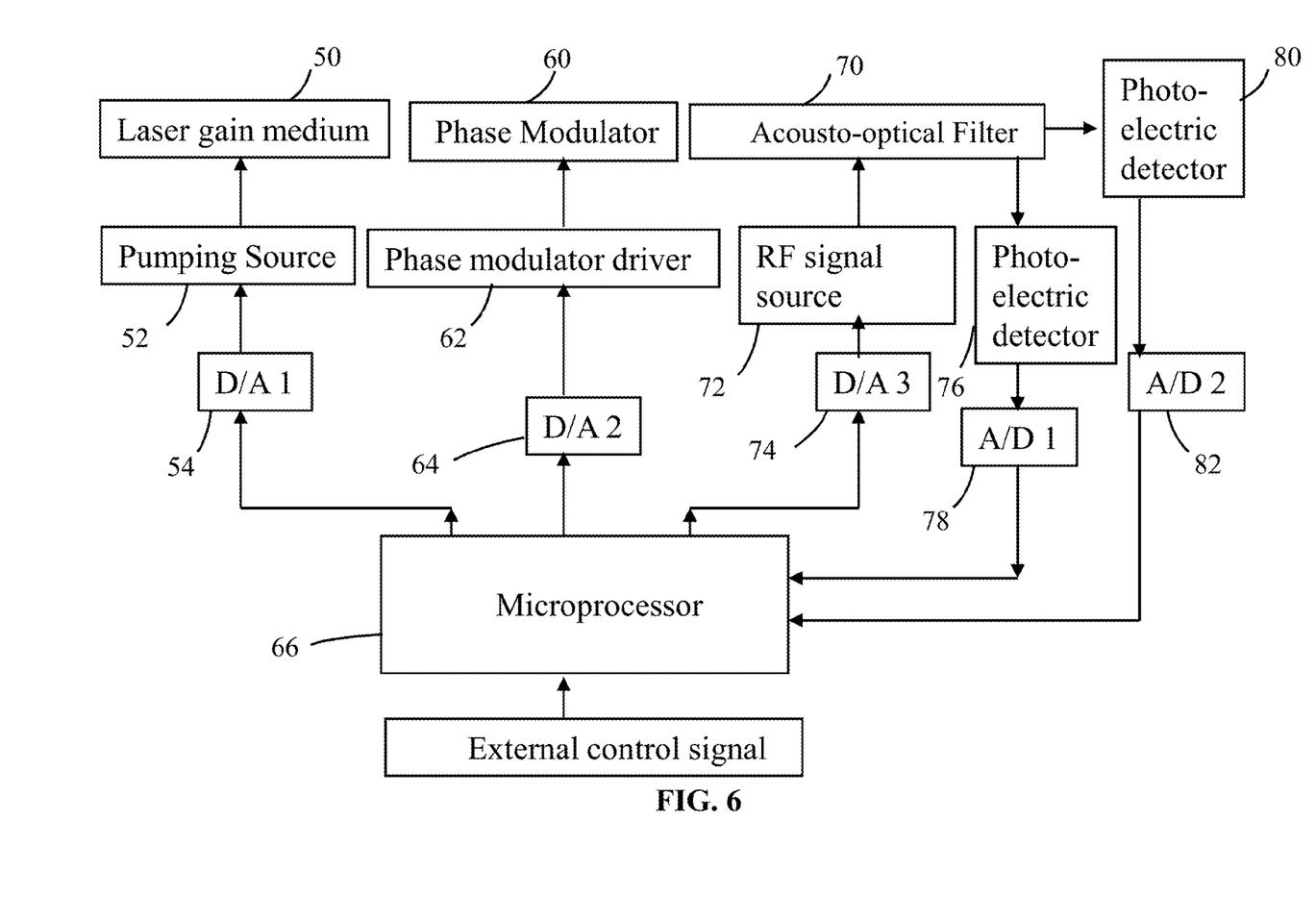
FIG. 6 is a functional block diagram of a signal control processing circuit.

The signal control processing circuit of the tunable laser 300 is shown as FIG. 6. In the signal control processing circuit, a central control unit is a microprocessor 66 with embedded software program. The microprocessor 66 receives signals from photoelectric detectors 76 and 80 via analog-to-digital conversion (A/D) devices 78 and 82, and these signals comprise the information of laser output power and wavelength shift. The information is processed by the program embedded in the microprocessor 66. The microprocessor 66 sends signals via digital-to-analog (D/A) devices 74, 64, and 54 to respectively control a radio frequency (RF) power source 72 to adjust acousto-optic filter 70, the optical phase modulator driver 62 to adjust the optical phase modulator 60, and the pumping source 52 to adjust the gain of the gain medium 50, thus achieving the purposes of adjusting the frequency of radio frequency, laser phase matching conditions and pumping power. In the case of frequency or wavelength shift, or in the case of the reception of an external instruction for changing laser wavelength or power, the stable power and wavelength output of the laser can be realized by the closed feedback control loop.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A tunable laser, comprising:
a) a laser resonant cavity comprising first and second total reflection cavity mirrors within a laser oscillating spectral range;
b) a laser gain medium disposed in the laser resonant cavity and carrying out laser oscillation in a specified laser wavelength range;
c) an intra-cavity collimating lens;
d) an acousto-optic tunable filter disposed in the laser resonant cavity, light beam emitted from the laser gain medium being collimated by the intra-cavity collimating lens and then input into the acousto-optic tunable filter at a Bragg angle;
e) a device exciting sound waves in an acousto-optic crystal and comprising a sound wave energy transducer bonded on a selected surface of the crystal; the acousto-optic tunable filter, the two reflection minors and the laser gain medium being disposed in such a manner that laser oscillation is formed in the laser resonant cavity only by the first order diffracted beam of the acousto-optic tunable filter;
f) a radio frequency signal source providing radio frequency energy for the energy transducer and adjusting the oscillation wavelength of the laser resonant cavity by changing radio signal frequency;
g) an optical phase modulator disposed between the intra-cavity collimating lens and the acousto-optic crystal;
h) an optical etalon disposed between the optical phase modulator and the laser gain medium;
i) a wavelength locker disposed at one of zero-order diffraction optical paths of intra-cavity light;
j) a pigtailed collimator coupling laser output light to an optical fiber;
k) a pumping source exciting the laser gain medium;
l) a phase modulator driver for driving the optical phase modulator; and
m) a signal control processing circuit.

2. The tunable laser of claim 1, wherein the acousto-optic tunable filter is disposed at a position for forming a Bragg angle with respect to collimated beams emitted from the laser gain medium and maintains laser beams for different wavelengths at the Bragg angle.

3. The tunable laser of claim 1, wherein the first and second laser cavity minors are a plane minor, a convex minor, a concave minor, or a combination thereof.

4. The tunable laser of claim 1, wherein the optical etalon has a free spectral range of 25 GHz, 50 GHz, or 100 GHz.

5. The tunable laser of claim 1, wherein the optical phase modulator is an electro-optical phase modulator, or a physical optics effect-based optical phase modulator in other forms.

6. The tunable laser of claim 1, wherein the wavelength locker comprises a beam splitter disposed in one of the zero-order diffraction optical paths of intra-cavity light and at 45-degree angle therewith; a first photoelectric detector for receiving reflective light from the beam splitter; an optical filter having wavelength-varying transmittance disposed between the beam splitter and a second photoelectric detector; and the second photoelectric detector for receiving an optical signal output from the optical filter having wavelength-varying transmittance.

7. The tunable laser of claim 1, wherein the pigtailed collimator comprises a polarization maintaining fiber and a gradient index lens, or a single-mode fiber and a gradient index lens.

8. The tunable laser of claim 1, wherein the acousto-optic tunable filter comprises an anisotropic birefringent acousto-optic crystal with optical spectrum characteristics conforming to laser spectral requirements.

9. The tunable laser of claim 6, wherein the signal control processing circuit comprises:
   a) a microprocessor;
   b) a first digital-to-analog converter connected to the microprocessor to control the laser pumping source;
   c) a second digital-to-analog converter connected to the microprocessor to control the optical phase modulator driver;
   d) a third digital-to-analog converter connected to the microprocessor to control a radio frequency source;
   e) a first analog-to-digital converter connected to the first photoelectric detector to detect laser power and input a signal to the microprocessor; and
   f) a second analog-to-digital converter connected to the second photoelectric detector to detect an optical signal output by the optical filter with variable transmittance, and feed the optical signal back to the microprocessor for laser wavelength control.

10. The tunable laser of claim 6, wherein a ratio of reflectivity/transmittance of the beam splitter is 50%.

11. The tunable laser of claim 6, wherein the optical filter having wavelength-varying transmittance is a multilayer dielectric thin film filter or an optical etalon.

12. The tunable laser of claim 6, wherein the optical characteristics of the first photoelectric detector and the second photoelectric detector are matched with laser output spectrum.

* * * * *